June 20, 1944.  B. O. AUSTIN  2,351,901
CIRCUIT CONTROLLING APPARATUS
Filed July 24, 1943
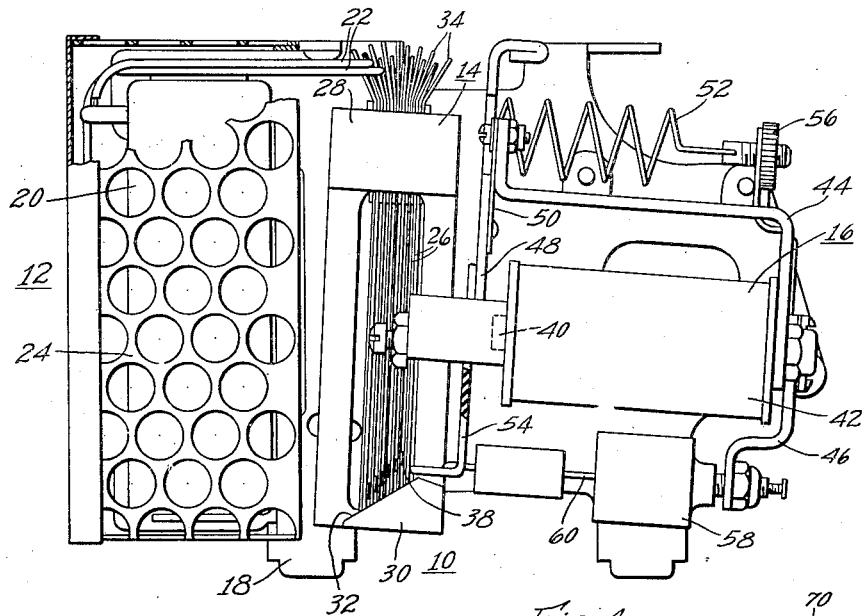
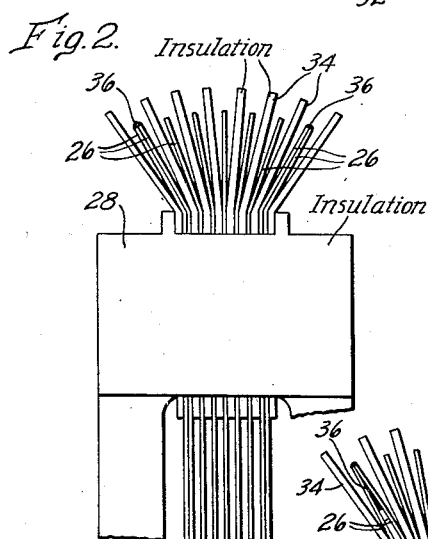
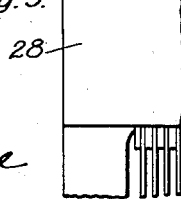
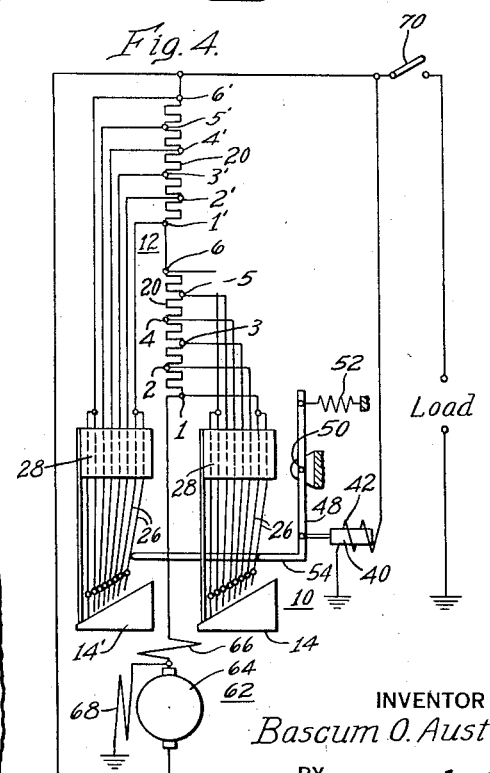
INVENTOR
Bascum O. Austin.

Patented June 20, 1944

2,351,901

UNITED STATES PATENT OFFICE 2,351,901

CIRCUIT CONTROLLING APPARATUS

Bascum O. Austin, Wapakoneta, Ohio, assignor to Westinghouse Electric & Manufacturing Company, East Pittsburgh, Pa., a corporation of Pennsylvania Application July 24, 1943, Serial No. 495,988

3 Claims. (Cl. 200—97)

This invention relates to electrical apparatus and, in particular, to circuit controlling apparatus.

Heretofore, circuit controlling apparatus of the type disclosed and claimed in a copending application of R. C. Jones, Serial No. 415,614, filed October 18, 1941, now issued as Patent No. 2,326,036, has been developed primarily for use in voltage regulators of the aircraft type. Such circuit controllers have given exceptional service over the range of temperature to which they are subjected in use. These circuit controllers utilize a stack of long, thin, self-biased switch members as a part of the construction for effecting a reduction in weight and size while obtaining a large number of steps of resistance for a small movement of a member responsive to a condition to be controlled.

In practice, it is found that the overcurrents which are sometimes encountered where such apparatus is utilized, as where the switch members are closed and there is very little resistance in series therewith to control the current, effect an overheating of the end switch members. When thus overheated, the long, thin, self-biasing switch members at the ends of the stack lose their temper and often become distorted necessitating frequent replacement of the stack of switch members as a unit. Many attempts have been made to overcome this difficulty but until the present invention, such attempts have proven to be unsuccessful or unsatisfactory.

An object of this invention is to provide a circuit controlling apparatus having a high overcurrent capacity.

A more specific object of this invention is to protect a circuit controlling apparatus utilizing a stack of long, thin, switch members from damage occasioned by overcurrent under predetermined operating conditions.

Other objects of this invention will become apparent from the following description, when taken in conjunction with the accompanying description, in which:

Figure 1 is a view in elevation of a circuit controlling apparatus embodying the teachings of this invention;

Fig. 2 is an enlarged view of a part of the apparatus shown in Fig. 1;

Fig. 3 is an enlarged view of another embodiment of the part shown in Fig. 2; and Fig. 4 is a schematic diagram illustrating the circuit controlling apparatus of this invention.

Referring to Fig. 1, this invention is illustrated as applied to a circuit controlling device 10 of the general type disclosed in the hereinbefore-identified Jones Patent No. 2,326,036 which is assigned to the same assignee as this invention. In general, the circuit controlling device 10 comprises a resistor unit 12, a switching apparatus 14, and an electromagnetic device 16 disposed to control the operation of the switching apparatus 14, all of which is suitably mounted on a supporting base 18.

The resistor unit 12 may be of any suitable type or, as shown, may comprise a resistance element 20 provided with spaced taps (not shown) for securing leads 22 from the switching apparatus 14 and encased in a perforated guard or protective housing 24.

The switching apparatus 14 comprises a plurality of stacked long, thin, self-biased leaf-spring switch members 26 having one of their ends fixedly supported with respect to each other in an insulating clamping member 28 of insulating material, the details of which are not shown. The other ends of the leaf-spring members 26 are free to move away from an adjustable stop 30, the stop being provided with a beveled or sloped surface 32 for receiving and spacing the ends of the biased members 26 for limiting their movement in the self-biased direction.

As more clearly illustrated in Fig. 2, the fixed ends of the switch members 26 project outwardly from the clamp 28, certain of the switch members 26 having sheets or layers 34 of insulation, such as fishpaper or the like, disposed therebetween and extending out beyond the ends of the switch members for insuring that the switch members are insulated from one another. However, as illustrated, the two end switch members 26 at each end of the stack do not have insulation disposed therebetween, but instead, precaution is taken to maintain a good electrical connection between the ends of each of the two groups of end switch members, the ends of said switch members being suitably soldered or brazed together as at 36, the purpose of which will be more clearly explained hereinafter.

Instead of the embodiment illustrated in Fig. 2, the two end switch members 26 at each end of the stack may be electrically connected as shown in the embodiment of Fig. 3. In this form of the invention, the sheet of insulation 34 normally disposed between the switch members 26 is cut away a sufficient distance between the two end switch members, as illustrated, whereby the protruding ends of the switch members 26 can be forced together and soldered or brazed by depositing suitable soldering material 36 between the ends of the switch members.

Each of the self-biasing switch members 26 is of good conducting material such as beryllium-copper alloy or bronze and carries a contact button 38 near its free end. In the embodiment illustrated in Figs. 1 and 2 of the drawing, the end switch member at each end of the stack is not necessarily provided with a contact button 38 as each of the end switch members is so closely positioned to the adjacent switch member 26 that electrical contact is very readily made between each of the end switch members and its adjacent switch member. The contact buttons 38 are so positioned that as the switch members 26 are actuated away from the sloped surface 32 of the stop 30, the contact buttons 38 are progressively actuated into engagement. As illustrated, the projecting ends of the switch members 26 are connected by the leads 22 to the taps of the resistor unit 20.

The electromagnetic device 16 comprises a core member 40 having an energizing winding 42 carried thereon, the winding being disposed to be energized in a predetermined manner from a suitable source of power. The core member 40 also carries an upwardly projecting substantially S-shaped bracket 44 and a downwardly projecting bracket or lug 46 fixedly secured thereto for aiding in assembling the actuating mechanism of the device. As illustrated, the upper end of the bracket 44 is utilized for mounting a relatively long armature member 48 in operative position with respect to the core 40 and the coil assembly and switching assemblies.

The armature member 48 is disposed for pivotal movement about a pivot 50 and is so biased in a clockwise direction thereabout by a spring 52 as to effect a movement of a driver member 54 against the stack of switch members 26 to effect a progressive engagement of the contact buttons 38 carried thereby to actuate them away from the stop. The spring 52 anchored at one end to an adjustable nut 56 carried by the frame of the electromagnetic apparatus 16 is provided to balance the magnetic pull on the armature member 48 when the winding 42 is energized. As clearly disclosed in the aforesaid Jones patent, a dashpot 58 is carried by the bracket 46 and connected to the driver member 54 by means of a fine stiff wire 60 for stabilizing the operation of the armature member 48 in effecting a switching operation of the stack of switch members 26.

In practice, and as disclosed in the aforesaid Jones patent, two of the switching assemblies 14 are usually employed in controlling the number of steps of resistance in a particular circuit, the switching assemblies 14 being so arranged that the switch members of the two stacks are operated in an interleaved relation with respect to each other, the one armature member 48 providing the actuation for the switch members 26 of the two units.

Referring to Fig. 4 of the drawing, the circuit controlling apparatus of this invention is illustrated as employed in a regulating circuit in which two of the stacks of switching members 14 are utilized for controlling the voltage of a generator 62. The generator 62 may be driven by any suitable motor or prime mover (not shown) and comprises an armature winding 64, a shunt field winding 66 and a series field winding 68.

As illustrated, one side of the armature winding 64 is connected to ground through the series field winding 68, the other side of the armature winding being disposed to be connected through a switch 70 to a load (not shown) and thence to ground. Two regulating resistor units or elements 20, each of which is formed of a number of resistor sections which are disposed to be connected in series circuit relation with the shunt field winding 66, are provided for controlling the excitation of the field winding.

As illustrated, the circuit controlling device 10 of this invention is disposed for controlling the number of sections of the series connected resistor elements 20 which are connected in circuit with the field winding 66. The switching assemblies identified as 14 and 14' have the terminals of their switch members 26 connected to different taps of their associated resistor elements 20 with the exception of the first two and last two of the switch members 26 of each of the stacks. As illustrated, the first two switch members 26 of the switching assembly 14 are disposed to be connected as by means of the solder 36 in parallel circuit relation, the junction of the switch members being connected to the terminal 1 of the associated resistor unit 20. The successive insulating switch members 26 of the unit 14 are progressively connected to terminals 2, 3, 4 and 5 of the resistor unit 20, the last two switch members 26 of the unit 14 being so soldered and connected to the terminal 6 that when the stack of switch members is in a closed position, the last two switch members 26 of the stack are connected in parallel circuit relation.

Similarly, the switch members 26 of the switching assembly 14' are connected to terminals 1', 2', 3', 4', 5', and 6' of the associated resistor unit 20, the first two and last two of the switch members 26 of the stack being so soldered and connected that when the stack is in a closed circuit position each of the first two and the last two of the switch members 26 of the stack are connected in parallel circuit relation.

With the resistor units 20 disposed to be connected in the manner described, the energizing coil 42 of the electromagnetic unit 16 is connected in shunt with respect to the load so that its energization will be a measure of the voltage drop across the load and a movement of the core member 40 will actuate the armature member 48 to effectively operate the switching assemblies 14 and 14' in a progressive but staggered relation.

In operation, assuming that the generator 62 is driven to deliver a predetermined voltage and the circuit controlling device 10 is operated in a predetermined manner whereby a number of the sections of the resistor elements 20 are connected in series circuit relation with the field winding 66, if for any reason the load supplied by the generator 62 is changed, for example if the load is decreased, then the winding 42 is energized to actuate the driving member 58 against the bias of its spring member 52 to effect a progressive but staggered release of the leaf-spring switch members 26 of the switching assemblies 14 and 14' to alternately control the connecting of the progressive sections of each of the resistor elements 20 in series circuit with the field winding to effect a decrease in the energization of the field winding 66 and thereby decrease the voltage of the generator 62.

Assuming that the circuit controlling device 10 has been operated to connect all the sections of the resistor elements 20 in circuit with the field winding 66, then if the load is increased the winding 42 is so deenergized that the driving member 58 is actuated under the influence of the spring 52 to effect a switching operation of the switching assemblies 14 and 14'.

In the embodiment illustrated, the driving member 58 first contacts the first switch member 26 of switching assembly 14 to force it away from the sloped stop and engage the second member 26. However, since the first two switch members 26 are connected at their fixed ends such movement of the driver member 58 fails to change the connections to the resistor sections in series with the field winding 66. A slight additional movement of the driver member 58 forces the first switch member 26 of the switching assembly 14' to effect an engagement of the second switch member but as in the case of the switching assembly 14, no change of the connections to the resistor sections is effected by such engagement of the first two switch members. A further slight movement, however, of the driver member 58 actuates the contact button of the second switch member 26 of the switching assembly 14 into engagement with the contact button of the third switch member of the switching assembly 14 to effectively shunt the resistor section between taps 1 and 2 of the associated resistor unit 20. Likewise, a further slight movement of the driving member 58 actuates the contact button of the second switch member 26 of the switching assembly 14' into engagement with the contact button of the third switch member 26 to effect the shunting of the resistor section between taps 1' and 2' of the associated resistor unit.

Continued alternate shunting of the resistor sections between the taps of the resistor units associated with the switching assemblies 14 and 14' is effected until a sufficient number of the resistor sections is shunted from circuit with the field winding 66 to increase the energization of the field winding and effect the necessary increase in the voltage of the generator 62. However, as will be noted, if an intermediate position of the switch members 26 is insufficient for correcting for the necessary change in the voltage, then all of the switch members 26 of the units 14 and 14' can be actuated to the position illustrated in Fig. 4, where all of the sections of the resistor units 20 are effectively shunted from the circuit with the field winding 66. Under such conditions, it is to be noted that the last two switch members of each of the assemblies 14 and 14' are actuated to a position where their contact members are in engagement whereby at least two switch members of each of the switching assemblies are connected in parallel so that any current flow therethrough is divided between the last two switch members and the first two switch members of each of the assemblies 14 and 14'.

By providing the parallel connected switch members, each of the switching assemblies 14 and 14' are safeguarded against overcurrent. The parallel switch members at each end of the stack of each of the assemblies effectively increases the overcurrent capacity of the circuit controlling apparatus approximately 100% providing the circuit controlling apparatus which is very rugged and lightweight. This is accomplished without increase in the over-all dimensions of the circuit controlling apparatus as the stack of switch members is very compact.

Although this invention has been described with reference to a particular embodiment thereof, it is, of course, not to be restricted thereto except insofar as is necessitated by the scope of the appended claims.

I claim as my invention:

1. In a circuit controlling apparatus, in combination, a stack formed of a plurality of self-biasing relatively long thin switch members arranged with one end of each supported in fixed relation to each other, the other ends of the switch members being free to move, means disposed to actuate the free ends of the switch members to contact making positions, means disposed between certain of the fixed ends for insulating said certain of the switch members from the adjacent members, and means for electrically connecting the fixed ends of certain of the switch members together at each end of the stack to provide a parallel connected current path at each end of the stack when the switch members are in contact making positions.

2. In a circuit controlling apparatus, in combination, a stack formed of a plurality of relatively long thin switch members arranged with one end of each supported in fixed relation to each other, the other ends of the switch members being free and disposed for movement, each of the switch members being self-biased in one direction to separate the free ends thereof, means disposed to actuate the free ends of the switch members in the other direction to effect a progressive circuit making engagement of the switch members, means for insulating the fixed ends of certain of the switch members, and means for electrically connecting the fixed ends of two of the switch members together at each end of the stack to provide a parallel connected current path at each end of the stack when the switch members are in contact making positions.

3. In a circuit controlling apparatus, in combination, a stack formed of a plurality of relatively long thin switch members arranged with one end of each supported in fixed relation to each other, the other ends of the switch members being free and disposed for movement, each of the switch members being self-biased in one direction to separate the free ends thereof, means disposed to actuate the free ends of the switch members in the other direction to effect a progressive circuit making engagement of the switch members, means for insulating the fixed ends of certain of the switch members, the fixed ends of the two switch members at each end of the stack being free of the insulation between the members, and means comprising solder for electrically joining and holding the fixed ends of each of the groups of said two switch members to provide a parallel connected current path at each end of the stack when the switch members are in contact making positions.

BASCUM O. AUSTIN.